United States Patent
Wu

(10) Patent No.: US 6,238,088 B1
(45) Date of Patent: *May 29, 2001

(54) DISPOSABLE CAP FOR INSTANT THERMOMETER MEASURING PROBE

(75) Inventor: Chung-Ping Wu, Hsinchu (TW)

(73) Assignee: Norm Pacific Automation Corp., Hsinchu Hsien (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,950

(22) Filed: Jan. 12, 1999

(51) Int. Cl.[7] ....................................... G01K 1/08
(52) U.S. Cl. ............................. 374/158; 374/209
(58) Field of Search ..................... 374/130, 131, 374/158, 209; 600/474, 549

(56) References Cited

U.S. PATENT DOCUMENTS

| | | | |
|---|---|---|---|
| 4,662,360 | * 5/1987 | O'Hara et al. | 374/158 |
| 4,790,324 | * 12/1988 | O'Hara et al. | 374/158 |
| 5,018,872 | * 5/1991 | Suszynski et al. | 374/133 |
| 5,088,834 | * 2/1992 | Howe et al. | 374/158 |
| 5,159,936 | * 11/1992 | Yelderman et al. | 374/158 |
| 5,232,284 | * 8/1993 | Egawa et al. | 374/133 |
| 5,707,343 | * 1/1998 | O'Hara et al. | 600/474 |
| 5,833,367 | * 11/1998 | Cheslock et al. | 374/158 |
| 5,906,437 | * 5/1999 | Lin | 600/474 |

* cited by examiner

Primary Examiner—Diego Gutierrez
Assistant Examiner—Jeanne-Marguerite Goodwin
(74) Attorney, Agent, or Firm—Rosenberg, Klein & Lee

(57) ABSTRACT

A disposable plastic injection molded probe cap used in conjunction with a measuring probe of an infrared instant thermometer, essentially comprised of a closed end at the top and an open bell, wherein, the thinner closed end provided with a window portion is connected to the bell by side wall, a fastening portion of the side wall having its diameter slightly smaller than the outer diameter of the front end of said probe for the ear probe cap to interference fit to the front end of the measuring probe is formed at where near to the window portion, in addition, a flange can be formed on the side wall.

2 Claims, 5 Drawing Sheets

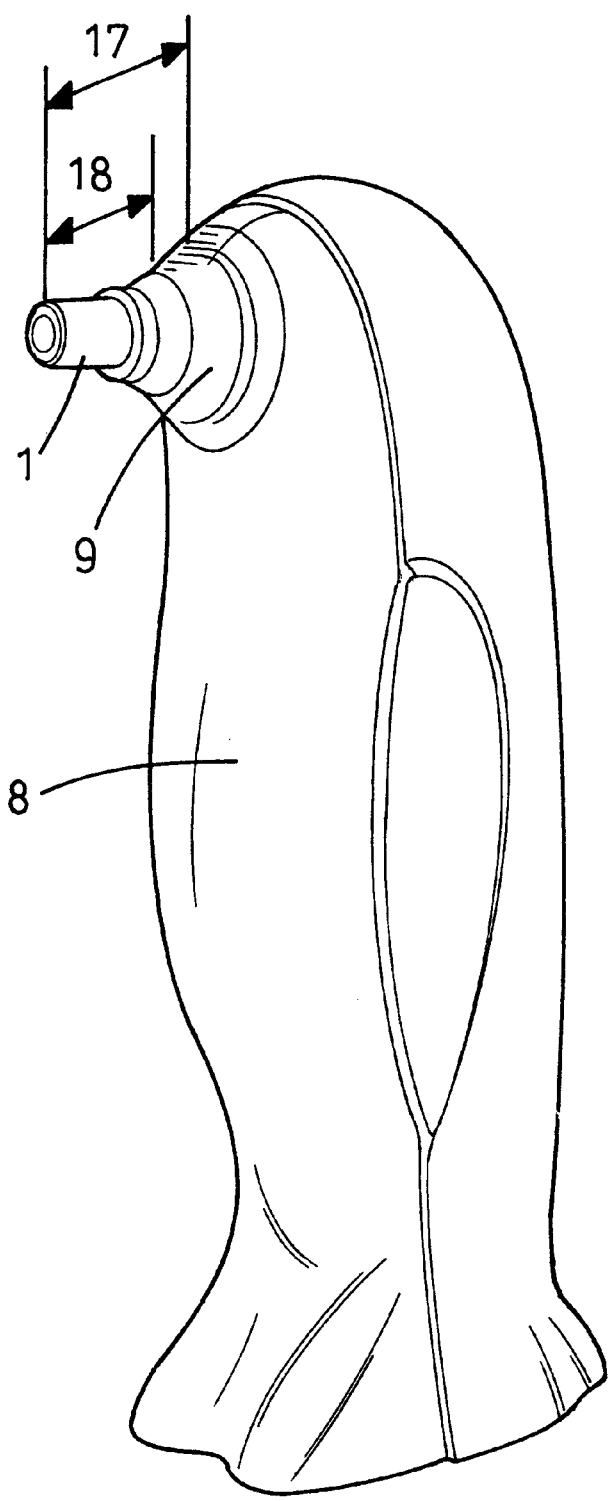
F I G. 1

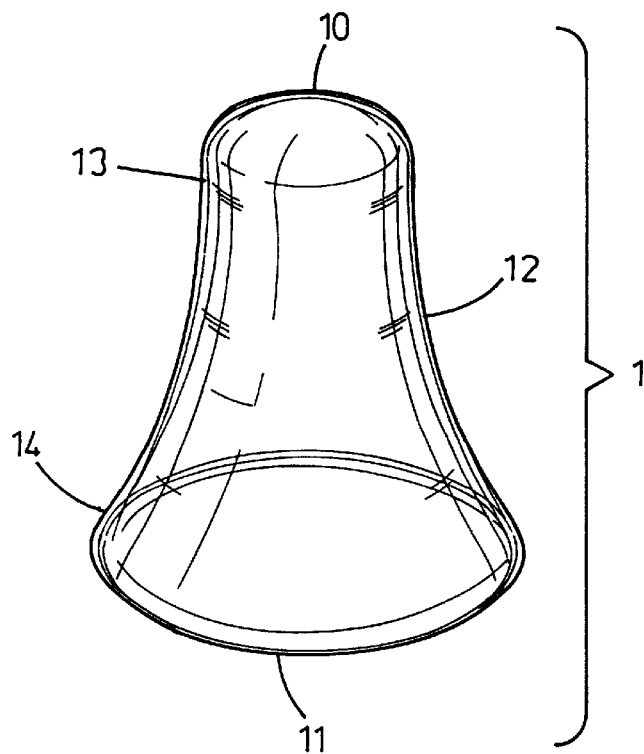
F I G. 3A
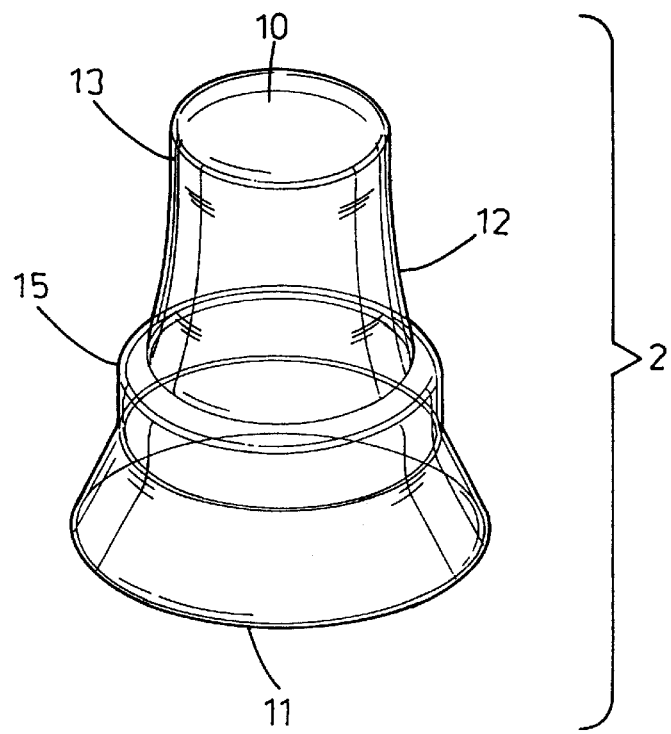
F I G. 3B

DISPOSABLE CAP FOR INSTANT THERMOMETER MEASURING PROBE

BACKGROUND OF THE INVENTION

1. Field of the Invention

The present invention relates to an improved ear thermometer probe cap, and more particularly, to an integrally formed one-piece ear probe cap with modified interlocking structure at the base of its bell.

2. Description of the Prior Art

The prior art of instant thermometer using infrared sensing technology has gradually replaced traditional mercury thermometer thanks to fast response by the former. It works by sensing the infrared strength radiated from the ear drum in auditory canal with an instant thermometer to measure auditory temperature. In practical use, the instant thermometer measuring probe is inserted into the accessory opening of auditory canal, and a sterilized probe cap must be attached to the measuring probe to avoid pollution or affection by bacteria Generally, a disposal probe cap is used which is essentially available in the market in two types.

One type of probe cap is comprised with three members, a polyethylene(PE) diaphragm folded into a cup shape in its peripheral and two pieces of rings forming themselves into a base which includes hooks to hold together by clamping the circumference of the folded diaphragm, thus to form an enclosed diaphragm window end and a base opening end. It takes advantage of grooves provided on the base ring to interlock protrusion bolt provided at the bottom of the measuring probe. This type of probe cap is found with several defects, namely, complicate processes as it is comprised of three individual members, resulting in waste of materials and higher cost; and being much less attractive in appearance as it is made of diaphragm with the exception of its base, showing rugous peripheral and irregular shape.

Another type of probe cap is made in one-piece having a very thin portion at its window end, comparatively sturdy side wall that can be formed with a definite shape, its base is the thickest part and a grooved ring which can be fixed by a hook from the base of the measuring probe of the instant thermometer, is provided at where close to the side wall at the base. However, as the length of a measuring probe of an instant thermometer must be sufficient to reach the accessory opening of auditory canal, and when inserted into one's ear, it takes only for the measuring probe to contact one small section at the front end of the measuring probe, this another type of the prior art gets too long due to being subject to the interlocking device provided at the base of the whole length of the measuring probe, thus leading to waste of materials, higher production cost and environmental issue when disposed of.

SUMMARY OF THE INVENTION

The object of the prevent invention is to provide a disposable cap for an instant thermometer measuring probe. The probe cap is integrally molded with plastic material allowing transmission of infrared, essentially made of one end close as a window portion and a bell with both connected by the side wall, and a fastening portion formed on the side wall at where near to the window portion which is used in conjunction with the dimension of the measuring probe to interference fit the probe cap onto the measuring probe, so that the size of the bell is not restricted by that of the measuring probe, nor any interlocking means is needed between the probe cap and the measuring head, and the probe cap can be made shorter for material saving. An additional flange can be provided at the mid of the side wall or the portion closed to the bell is made thicker to improve the structural strength of the probe cover for facilitating to wear or remove the probe cap, while such flange or thicker bell also provides separation purpose for easy access to a stack of multiple of probe caps.

BRIEF DESCRIPTION OF THE DRAWINGS

FIG. 1 is a schematic view of the prevent invention attached to a ear measuring thermometer;

FIG. 3A is a view of the appearance of the first preferred embodiment of the present invention;

FIG. 3B is a view of the appearance of the second preferred embodiment of the present invention.

DETAILED DESCRIPTION OF THE PREFERRED EMBODIMENTS

Referring to FIG. 1, a probe cap 1 of the present invention is attached to a measuring probe 9 of an instant thermometer 8 (the shape of the instant thermometer is not limited to that as illustrated). The measuring probe 9 is in length of 17 and with its shape and dimension allowing comfortable insertion into one's ear to touch the accessory opening of external auditory canal(not illustrated) for receiving infrared emitted from the ear drum in measuring temperature. Basically, the shape of the probe cap 1 matches with that of the measuring probe 9 and can be tightly attached to the measuring probe 9 and the length 18 of the probe cap 1 is shorter than that of the measuring probe 9.

Figure 2A:
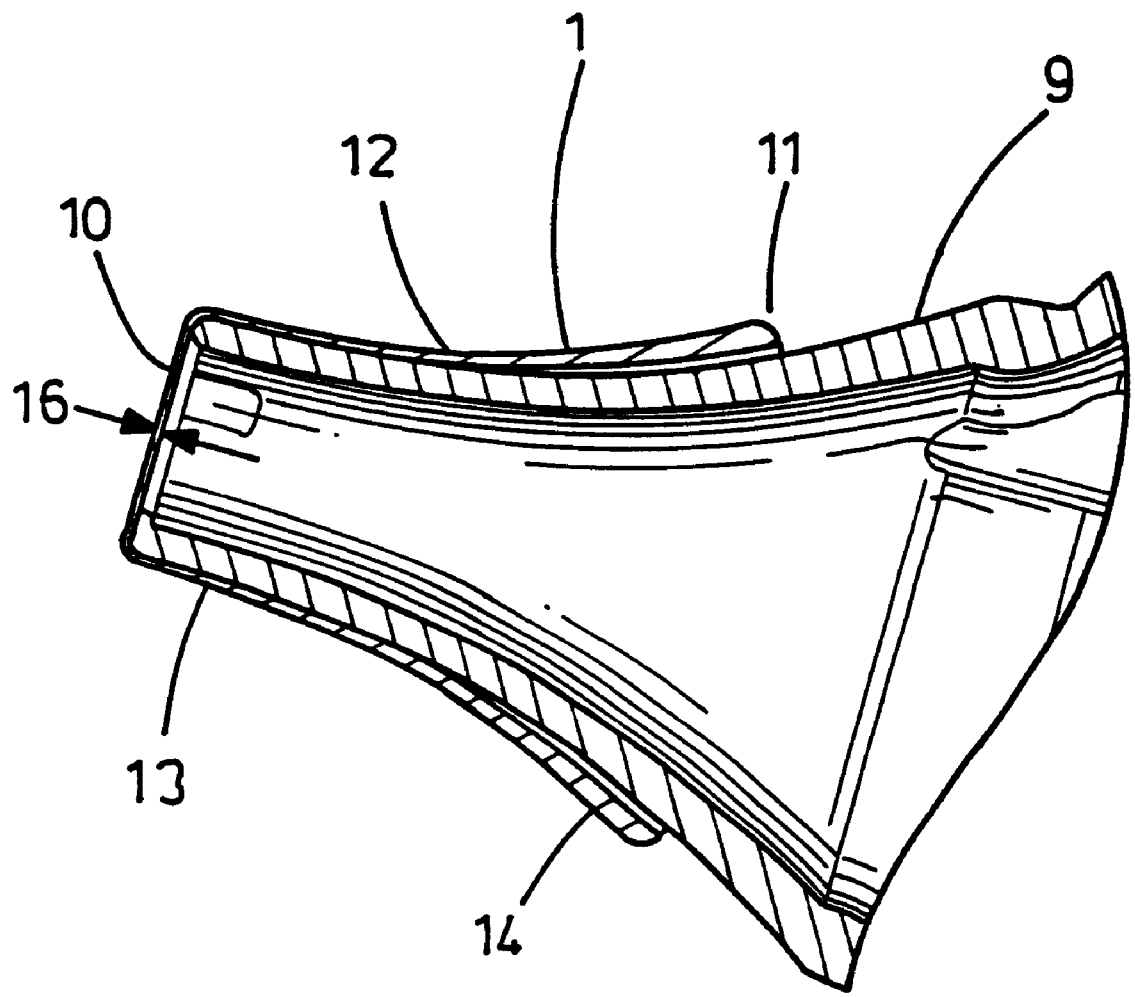
FIG. 2A is a sectional view of a first preferred embodiment of the present invention in use.

Now referring to FIGS. 2A and 3A for a first preferred embodiment of the present invention, wherein, members including an optical tube in the measuring probe 9 are not illustrated. The probe cap 1 is comprised of a diaphragm window portion 10, a thicker bell 11 and an annular side wall 12 integrally molded in polyethylene(PE) or polypropylene (PP) as these polymeric materials give excellent transmission to infrared with wave length of approximately 4~20 $\mu$m. Furthermore, a fastening portion 13 is formed on the side wall 12 at where abutted to the window portion end 10 of the probe cap 1, the size of the fastening portion 13 indicates interference fit the front end of the measuring probe 9 to provide proper torque that is sufficient for the probe cap 1 to cap on the measuring probe 9, and after the use, the probe cap 1 can be removed for disposal. As the probe cap 1 is tightly engaged with the front end of the measuring probe 9 by taking advantage of the fastening portion 13, provision of any groove or protrusion interlocking design is not required on the measuring probe 9. Therefore, the size of the bell 11 of the probe cap 1 is not strictly restricted by that of the measuring probe 9 of the instant thermometer 8, that is, it allows certain compromise to tightness to the engagement. Furthermore, the probe cap 1 can be designed as compact as possible in a length one fourth shorter than that of the prior art for saving material and when disposed of, it also creates less impacts upon the environment.

To allow effective penetration by infrared radiation, the probe cap 1 must be made very thin at the window portion 10 in thickness 16 approximately falling within 0.01 mm~0.015 mm; while thicker within 0.02 mm~0.1 mm at the fastening portion 13, and a more thicker and harder portion 14 is formed around the bell 11 to facilitate pushing into position for measurement and retreating after the measurement. The inner diameter of the fastening portion 13 is slightly smaller than the outer diameter of the measuring probe 9 so to achieve effective tightness for the probe cap 1 to firmly secure to the measuring probe 9 while holding against the window portion 10 for easy penetration by infrared.

Figure 2B:
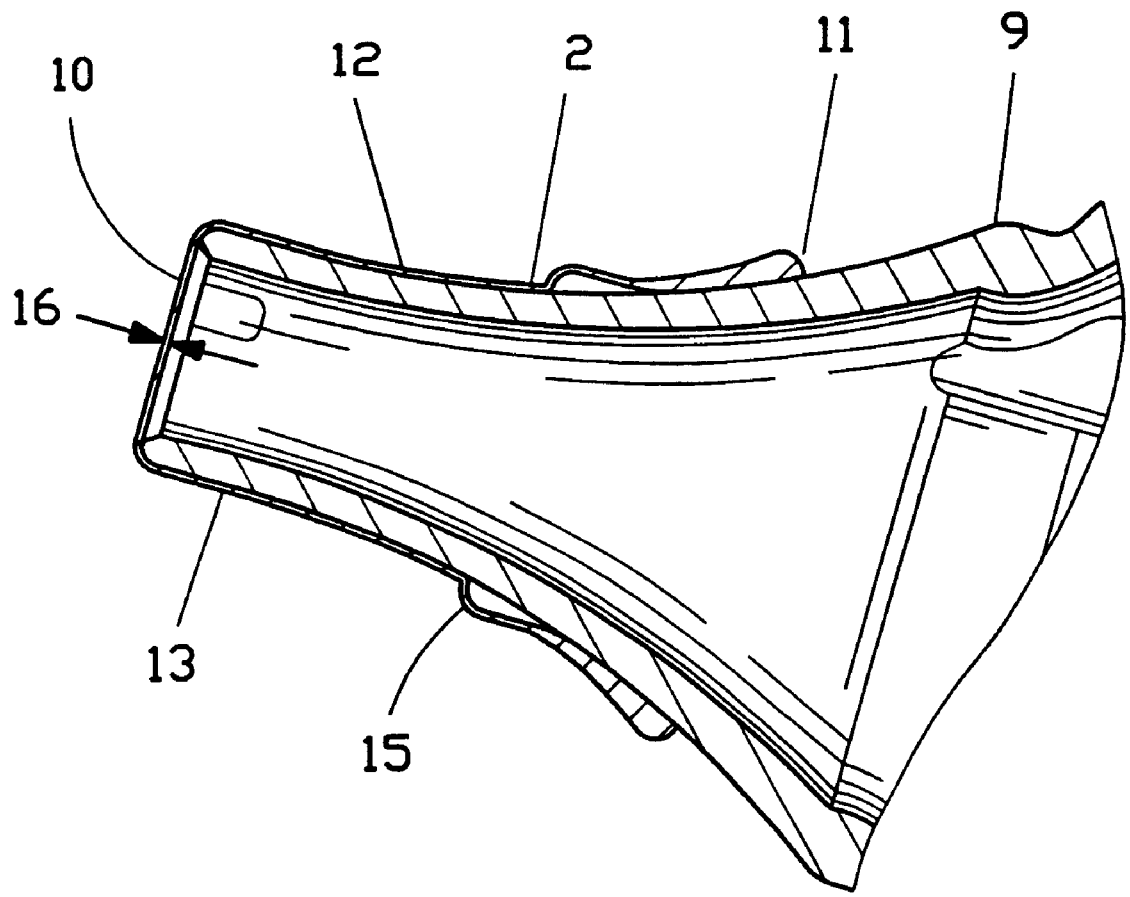
FIG. 2B is a sectional view of a second preferred embodiment of the present invention in use.

As illustrated in FIGS. 2B and 3B, the second preferred embodiment of the present invention also is comprised of the window portion 10, the bell 11, the side wall 12 and the fastening portion 13, wherein, the dimensional relation among the thickness 16 of the window portion 10, the fastening portion 13 and the measuring probe 9 is the same as that in the first preferred embodiment.

However, the change in thickness of the side wall 12 in the second preferred embodiment is less pronounced than that in the first preferred embodiment, and an additional flange 15 is provided in the intermediate portion of the side wall 12 or at or near to the bell 11 to reinforce the structural strength of the probe cap 1 so that it will not be vulnerable to deformation, and make it easier for the user to cap the probe cap 1 on or remove it from the measuring probe 9 of the instant thermometer 8.

Figure 4:
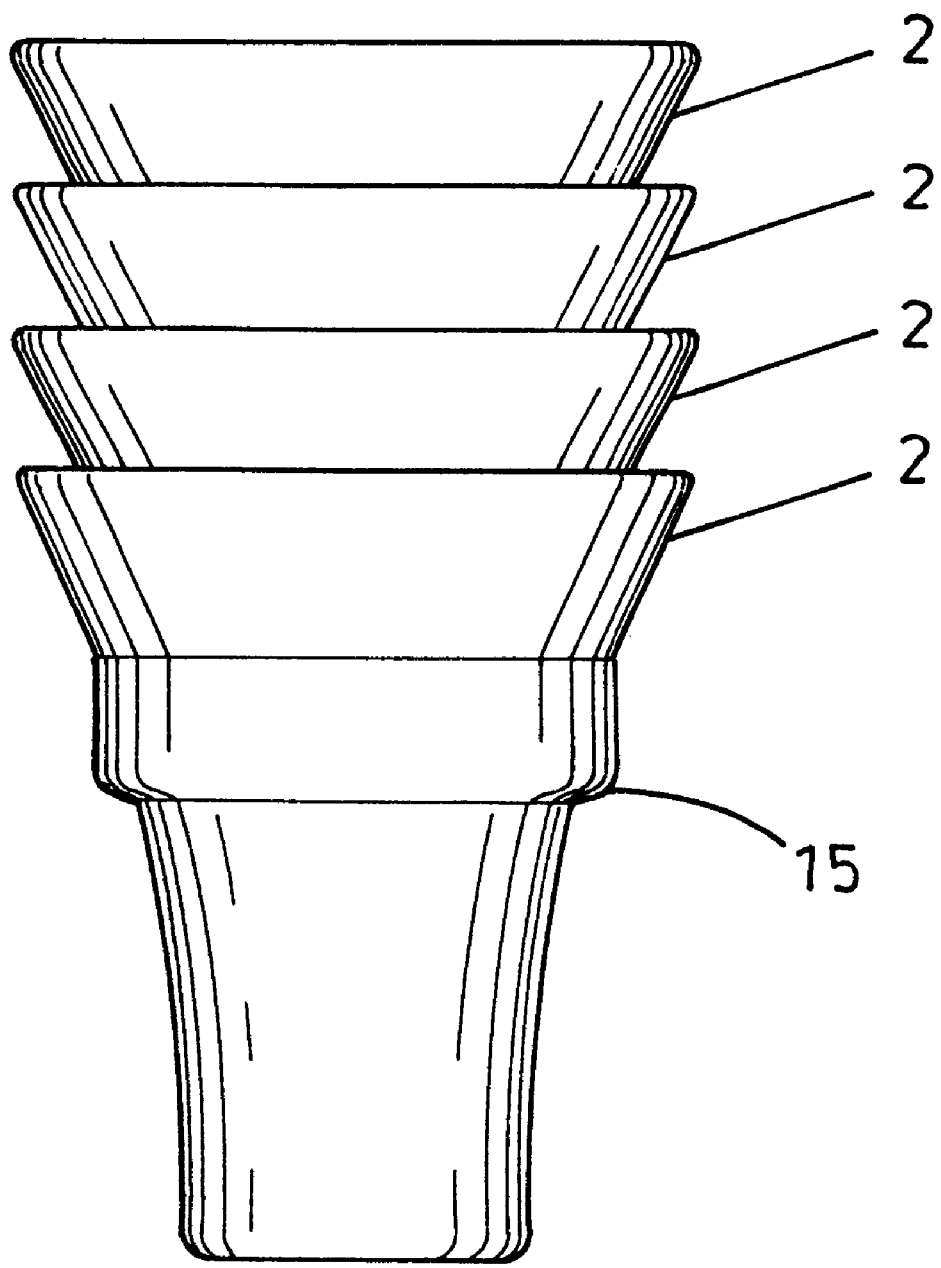
FIG. 4 is a schematic view of the present invention in stacked up status.

The purpose of the harder portion 14 and the flange 15 respectively disclosed in the first and the second preferred embodiments is to facilitate separation results by staking up more than one probe cap 2 of the present invention, as illustrated in FIG. 4, within, for space saving storage purpose, several probe caps 2 are stacked up with a certain spacing between two abutted probe caps 2 without sticking to each other for easy fetch when needed.

What is claimed is:

1. An apparatus comprising an instant thermometer measuring probe and a disposable cap for removable attachment to the instant thermometer measuring probe, said disposable cap consisting essentially of a thin closed window end, an opposing open end, and an annular side wall extending therebetween, said disposable cap being formed integrally in one-piece of a plastic material being transmissive to infrared energy, said side wall having a thickness increasing linearly between said closed window end and said open end, said side wall having a fastening portion formed adjacent said closed window end with an inner diameter slightly smaller than an outer diameter of the measuring probe to retentively engage in interference fit manner a front end of the measuring probe of the instant thermometer, said side wall having formed intermediately thereon a radially protuberant annular flange for providing structural reinforcement of said side wall and facilitating the manipulation of said disposable cap.

2. An instant thermometer apparatus comprising:
   (a) a measuring probe having a front end portion defining an outer diameter; and,
   (b) a disposable cap removably attached to said measuring probe end portion, said disposable cap having a thin closed window end, an opposing open end, and an annular side wall extending therebetween, said disposable cap being formed integrally in one-piece of a plastic material being transmissive to infrared energy, said side wall having a thickness increasing linearly between said closed window end and said open end, said side wall having a fastening portion formed adjacent said closed window end with an inner diameter slightly smaller than said outer diameter of said measuring probe front end portion to retentively engage said measuring portion front end portion in interference fit manner, said side wall having formed intermediately thereon a radially protuberant annular flange for providing structural reinforcement of said side wall and facilitating the manipulation of said disposable cap.

\* \* \* \* \*